3,374,278
PREPARATION OF ALKYL IODIDES FROM ALKYL ALCOHOLS AND ORGANOTIN IODIDES
Harold Coates, Wombourn, and Peter Albert Theodore Hoye, Stourbridge, England, assignors to Albright & Wilson (Mfg.) Limited, Oldbury, near Birmingham, England, a British company
No Drawing. Filed Oct. 14, 1963, Ser. No. 316,131
Claims priority, application Great Britain, Oct. 15, 1962, 38,891/62
18 Claims. (Cl. 260—652)

ABSTRACT OF THE DISCLOSURE

Alkyl iodide is prepared by heating an organotin iodide in the presence of hydrogen chloride and an alkyl alcohol thereby forming alkyl iodide and organotin chloride; and the alkyl iodide is recovered from the reaction mixture.

This invention relates to improvements in the production of organotin halides.

It has recently been shown by Matsuda and Matsuda, see for example Bulletin of the Chemical Society of Japan, vol. 35 (1962), pages 208–211, and U.S. Patent 3,085,102, that alkyltin iodides may be prepared by the direct reaction of metallic tin, or an alloy thereof, with an alkyl iodide. The reaction is preferably carried out in the presence of a little of the alcohol corresponding to the alkyl iodide, and a catalyst, such as powdered magnesium. Hitherto the production of organotin halides directly from metallic tin has been practicable only in the case of the methyltin halides, since the yields using other alkyl halides have been too low for commercial exploitation of the process. However, organotin halides are usually made by reacting a stannic halide with a Grignard reagent.

The use of the method proposed by Matsuda and Matsuda provides an alkyltin iodide as product and the synthetic route using a Grignard reagent may also do so, though more usually this route is operated to produce an organotin chloride. For commercial use organotin halides are usually converted into the corresponding oxide or an organotin ester. This is done by reaction of the organotin halide under alkaline conditions so that when the halide is an organotin iodide its iodine value is recovered as an iodide salt and this salt cannot readily be used in the production of a further quantity of the organotin iodide. It is, therefore, an object of the present invention to recover the iodine value of an organotin iodide in the form of an alkyl iodide which can subsequently be re-used by reaction with a further quantity of metallic tin or by conversion to a further quantity of Grignard reagent.

We have now found that the above object can be achieved by reacting an organotin iodide with gaseous hydrogen chloride or concentrated aqueous hydrochloric acid in the presence of an alcohol. Surprisingly, the hydrogen chloride appears to react with the organotin iodide preferentially to form an organotin chloride and not with the alcohol, to form an alkyl chloride, as would be expected. It appears that hydrogen iodide may be formed by reaction between the organotin iodide and the hydrogen chloride and that this hydrogen iodide reacts with the alcohol present to form the corresponding alkyl iodide. However, whatever are the exact reactions involved (the nature of which is not certain), the result is that an alkyl iodide rather than an alkyl chloride is formed, the alkyl group of the alkyl iodide corresponding to that of the alcohol present, and the organotin iodide is converted to an organotin chloride. This organotin chloride can then be employed for commercial purposes as such, or may be readily converted into an organotin oxide or ester with the resulting loss of the relatively inexpensive chlorine value of the halide rather than the much more expensive iodine value, which has been recovered in a convenient form for re-use. The organotin oxides and esters find extensive commercial use as stabilisers for polymeric materials, as catalysts for producing polyurethane materials and as fungicides.

Accordingly, the present invention provides a process for the recovery of the iodine value of an organotin iodide in the form of an alkyl iodide, which comprises reacting an organotin iodide of the general formula $R_nSnI_{4-n}$, wherein R represents a monovalent organic group and $n$ is 1, 2 or 3, with hydrogen chloride in the presence of an alcohol R'OH, to produce an alkyl iodide of the formula R'I and an organotin chloride of the formula $R_nSnCl_{4-n}$ and recovering the alkyl iodide from the reaction mixture.

The organotin iodide is normally an alkyltin iodide which contains alkyl groups having from 1 to 10 carbon atoms, especially butyl, hexyl or octyl groups. The alkyl groups can be substituted with substituents which do not interfere with the course of the reaction such as chlorine and/or cyano groups, and can, if desired, be unsaturated alkyl groups such as an allyl group. The organotin iodide may also be one having aryl or alkaryl groups, for example a benzyl group, bonded to the tin atom. Preferably the organotin iodide is a dialkyltin iodide of the general formula $R_2SnI_2$. Mixtures of organotin iodides can be treated according to the present invention.

The alcohol (R'OH) is, of course, derived from an alkyl or substituted alkyl group R'. Preferably such group is a primary alkyl group, since with secondary and tertiary alcohols side reactions often also occur resulting in the formation of ethylenically unsaturated by-products. In operating the process of the invention it is particularly desirable to use an alcohol in which the alkyl group or substituted alkyl group (R') is identical with that (R) in the organotin iodide which must therefore, in this instance, be an organotin alkyltin. In this way the recovered alkyl iodide can be reused to prepare a further quantity of the same organotin iodide. The process of the invention is particularly successful when using butanol, hexanol, an octanol or benzyl alcohol as the said alcohol.

The process of the reaction is usually carried out in the presence of a liquid medium. This may merely be an excess of the alcohol reactant which becomes progressively admixed with the alkyl iodide product. It is convenient to employ gaseous hydrogen chloride and pass this into the reaction mixture during the course of the reaction. However, we have found that the reaction mixture need not be anhydrous, though this is preferred, and that appreciable amounts of water may often without disadvantage be present in the reaction mixture as part of the liquid medium. This permits the use of concentrated hydrochloric acid as reactant. The presence of too much water in the reaction mixture should be avoided so that hydrolysis of the organotin halides does not occur. Thus the total weight ratio of water to hydrogen chloride present at any time during the reaction should not exceed 6:1. It is therefore possible to employ dilute hydrochloric acid in the present process, but this may not provide a satisfactory rate of reaction and it is preferable to use concentrated acid.

There may be present in the reaction mixture, if desired, inert liquid diluents or solvents for the reactants. such diluents include for example benzene, toluene, xylene and light petroleum or organic halides which have a boiling point which permits them to be readily separated from the alkyl iodide produced during the reaction.

The reaction may take place in a conventional vessel with agitation of the reaction mixture or in a column designed to give good gas-liquid contact, particularly a column in which the liquid and gaseous reactants flow counter-currently.

The reaction temperature is conveniently between 50° C. and 250° C. to provide a satisfactory rate of formation of the alkyl iodide. The optimum temperature depends on the nature of the organotin iodide and alcohol employed and the desired method of isolation and subsequent processing of the organotin chloride formed. A particularly convenient method of operation is to regulate the temperature and the reaction conditions so that the alkyl iodide formed in the reaction is removed continuously as an azeotrope with alcohol or as a ternary azeotrope with the alcohol and with water which is formed in the reaction together with any present initially. It therefore follows that in such a procedure the alcohol is desirably present in stoichiometric excess and that, if desired, the reaction may be conducted at sub-atmospheric pressure to assist in the removal of the alkyl iodide product.

If desired, catalysts may also be present in the reaction mixture. As catalysts there may advantageously be employed salts, preferably halides, of amphoteric metals, that is salts of metals whose oxides are soluble in alkali. Examples of such catalysts include zinc chloride, aluminum chloride and stannic chloride.

After, or during, the reaction the alkyl iodide is separated from the reaction mixture for example by distillation techniques and is purified in conventional manner for reuse. Any excess alcohol removed therewith from the reaction mixture may be recovered and reused in the process of the invention. The residual organotin chloride can be purified by distillation but is more usually converted into other organotin compounds, for example into the corresponding oxide by hydrolysis with an aqueous alkali, such a hydrolysis reaction occurring readily at ambient temperature, or by conversion to an organotin ester by a metathetical reaction with a metal or ammonium salt.

The invention will now be illustrated by the following examples:

*Example 1*

Dibutyltin diiodide (122 g.), n-butyl alcohol 74 g.) and zinc chloride (2 g.) were placed in an apparatus fitted with a gas inlet tube, stirrrer, dropping funnel, and a Dean and Stark distillation head and condenser.

The apparatus was flushed out with nitrogen and the mixture stirred at room temperature for one hour. Anhydrous HCl gas was passed into the stirred mixture until there was no further increase in temperature due to heat of solution of the HCl. The mixture was stirred and heated at reflux (102° C.) whilst passing a slow stream of HCl for 7 hours. The butyl iodide which separated from the aqueous butyl alcohol distillate in the Dean and Stark apparatus was run off from time to time. Small additions of n-butyl alcohol (total 54 g.) were made periodically so that the reaction temperature did not rise above 110° C.

When no more butyl iodide separated the temperature of the reaction mixture was raised during 30 minutes to 155° C. and the butyl alcohol distillate removed.

The combined butyl iodide and butyl alcohol distillates were dissolved in petroleum ether (B.P. 120–160° C.) and washed successively with concentrated aqueous hydrochloric acid (100 ml.) and water. Analysis showed the petrol extract to contain 78.4 g. butyl iodide (85% yield based on the $Bu_2SnI_2$).

The residue in the reaction vessel, dibutyltin dichloride (87 g.) was a pale brown liquid which crystallised readily at room temperature.

*Example 2*

The procedure of Example 1 was repeated using as reactants dibutyltin diiodide (244 g.), butyl alcohol (144 g.) and zinc chloride (1 g.); the reaction time was 12 hours 30 minutes.

The combined butyl iodide/butyl alcohol distillates were washed once with an equal volume of concentrated hydrochloric acid and water and then with water and dried over sodium sulphate. Analysis showed the yield of butyl iodide to be 84.7%. The yield of dibutyltin dichloride was 144 g.

*Example 3*

The procedure of Example 2 was repeated but using 2 g. of zinc chloride. The yield of butyl iodide was 66%.

*Example 4*

The procedure of Example 1 was repeated with the omission of the zinc chloride. The reaction time was 6 hours. The butyl iodide/butyl alcohol distillate was treated as in Example 2 to give a yield of 67% butyl iodide.

*Example 5*

Dibutyltin diiodide (123 g.); n-butyl alcohol (74 g.), zinc chloride (1 g.) and concentrated hydrochloric acid (S.G. 1.16, 116 g.) were mixed in a flask fitted with a stirrer and a modified Dean and Stark distillation head and condenser.

The mixture was thoroughly stirred and heated at reflux temperature for 3 hours. At the end of three hours the reaction mixture was distilled to give a butyl alcohol-butyl iodide/water ternary azeotrope. This was allowed to separate out and the aqueous layer returned to the reaction mixture. The distillation was continued until such time as substantially all the butyl iodide product had been recovered from the reaction mixture. This was judged to have been achieved when no more of the butyl alcohol/butyl iodide/water azeotrope distilled.

The distillate was then treated as in Example 1 to obtain an organic layer which on analysis was shown to contain 53.5 g. butyl iodide (58% yield based on the $Bu_2SnI_2$).

We claim:

1. The process for preparing an alkyl iodide which comprises heating to 50° C.–250° C. an organotin iodide selected from the group consisting of alkyltin iodide, aryltin iodide, alkaryltin iodide, and aralkyltin iodide, in the presence of hydrogen chloride and an alkyl alcohol, thereby forming alkyl iodide and organotin chloride; and recovering said alkyl iodide from the reaction mixture.

2. The process for preparing an alkyl iodide which comprises heating to 50–250° C. under substantially anhydrous conditions an organotin iodide selected from the group consisting of alkyltin iodide, aryltin iodide, alkaryltin iodide, and aralkyltin iodide, in the presence of hydrogen chloride and an alkyl alcohol, thereby forming alkyl iodide and organotin chloride, and separating said alkyl iodide from the reaction mixture.

3. The process for preparing an alkyl iodide which comprises heating to 50–250° C. an organotin iodide, $R_nSnI_{4-n}$, wherein R is selected from the group consisting of alkyl, aryl, and aralkyl containing 1–10 carbon atoms and $n$ is 1–3, in the presence of hydrogen chloride and an alkyl alcohol, thereby forming an organotin chloride, $R_nSnCl_{4-n}$, and an alkyl iodide; and recovering said alkyl iodide from the reaction mixture.

4. The process for preparing an alkyl iodide as claimed in claim 3 wherein the reaction is carried out under substantially anhydrous conditions.

5. The process for preparing an alkyl iodide as claimed in claim 3 wherein an excess of alkyl alcohol is employed.

6. The process for preparing an alkyl iodide as claimed in claim 3 wherein R is alkyl.

7. The process for preparing an alkyl iodide as claimed in claim 3 wherein the reaction is carried out in the presence of a catalyst selected from the group consisting of zinc chloride, aluminum chloride, and stannic chloride.

8. The process for preparing an alkyl iodide which comprises heating to 50–250° C. an alkyltin iodide, $R_nSnI_{4-n}$, wherein R is a primary alkyl containing 1–10 carbon atoms and $n$ is 1–3, in the presence of hydrogen chloride and a primary alkyl alcohol, ROH, thereby forming an alkyltin chloride, $R_nSnCl_{4-n}$, and a primary alkyl iodide, RI; and recovering said primary alkyl iodide from the reaction mixture.

9. The process for preparing an alkyl iodide as claimed in claim 8 wherein the reaction is carried out under substantially anhydrous conditions.

10. The process for preparing an alkyl iodide as claimed in claim 8 wherein an excess of primary alkyl alcohol is employed.

11. The process for preparing an alkyl iodide as claimed in claim 8 wherein the reaction is carried out in the presence of a catalyst selected from the group consisting of zinc chloride, aluminum chloride, and stannic chloride.

12. The process for preparing an alkyl iodide which comprises heating to 50–250° C. a dialkyltin diiodide, $R_2SnI_2$, wherein R is a primary alkyl containing 1–10 carbon atoms, in the presence of hydrogen chloride and a primary alkyl alcohol, ROH, thereby forming a dialkyltin dichloride, $R_2SnCl_2$, and a primary alkyl iodide, RI; and recovering said primary alkyl iodide from said reaction mixture.

13. The process for preparing an alkyl iodide as claimed in claim 12 wherein R is butyl.

14. The process for preparing an alkyl iodide as claimed in claim 12 wherein R is octyl.

15. The process for preparing an alkyl iodide as claimed in claim 12 wherein R is hexyl.

16. The process for preparing an alkyl iodide as claimed in claim 12 wherein R is benzyl.

17. The process for preparing an alkyl iodide as claimed in claim 12 wherein the reaction is carried out in the presence of a liquid medium.

18. The process for preparing an alkyl iodide as claimed in claim 17 wherein the liquid medium is concentrated aqueous hydrochloric acid.

References Cited

UNITED STATES PATENTS

| | | | |
|---|---|---|---|
| 2,717,911 | 9/1955 | Huter et al. | 260—652 |
| 3,100,215 | 8/1963 | Gelbert | 260—429.7 |
| 3,129,236 | 4/1964 | Weissenberger | 260—429.7 |
| 3,308,142 | 3/1967 | Coates et al. | 260—657 X |

FOREIGN PATENTS 565,452  11/1944  Great Britain.

OTHER REFERENCES

Bradley et al: "J. Chem. Soc.," 1957, pp. 3039–42.

LEON ZITVER, *Primary Examiner.*

T. G. DILLAHUNTY, *Assistant Examiner.*